Figure 1:
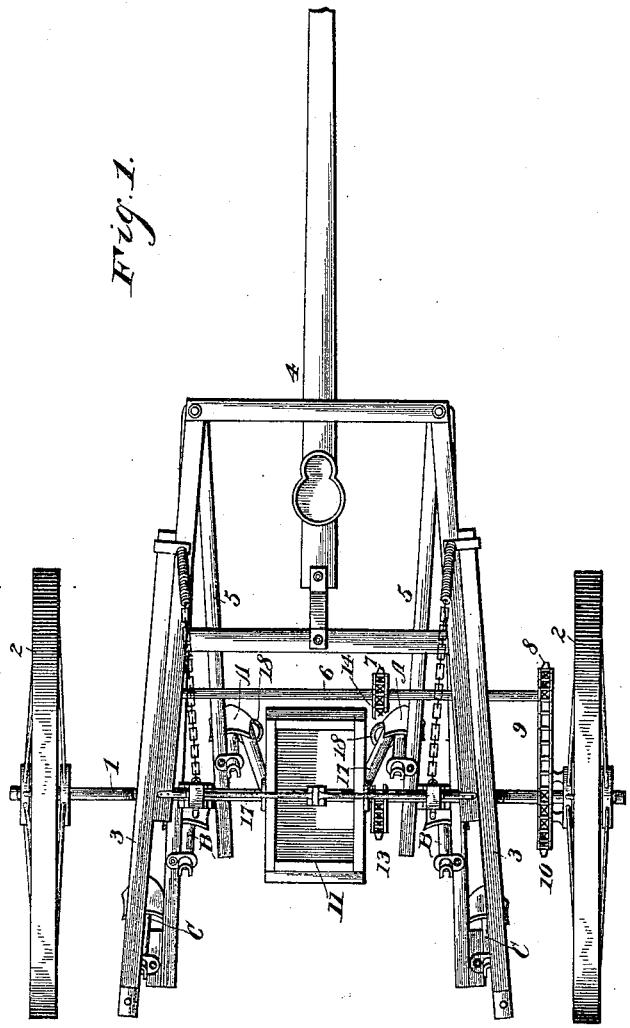

(No Model.) 2 Sheets—Sheet 1.

H. C. STAHL & W. P. JOHNSTON.
FERTILIZER DISTRIBUTER.

No. 481,209. Patented Aug. 23, 1892.

Witnesses;

Inventors.
Harlow C. Stahl and
Wm. P. Johnston,
By their Attorneys,
C. A. Snow & Co.

(No Model.) 2 Sheets—Sheet 2.
H. C. STAHL & W. P. JOHNSTON.
FERTILIZER DISTRIBUTER.
No. 481,209. Patented Aug. 23, 1892.
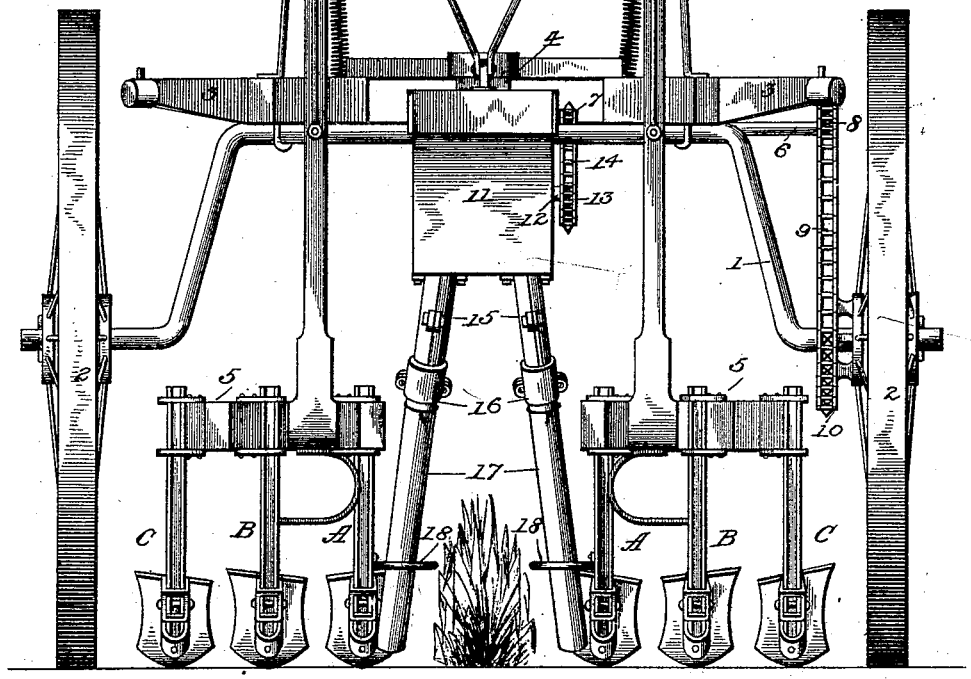
Witnesses;
Inventors,
Harlow C. Stahl and
Wm. P. Johnston,
By their Attorneys,

UNITED STATES PATENT OFFICE.

HARLOW C. STAHL, OF BELLEVUE, OHIO, AND WILLIAM P. JOHNSTON, OF MONROE, LOUISIANA.

FERTILIZER-DISTRIBUTER.

SPECIFICATION forming part of Letters Patent No. 481,209, dated August 23, 1892.

Application filed March 8, 1892. Serial No. 424,185. (No model.)

*To all whom it may concern:*

Be it known that we, HARLOW C. STAHL, residing at Bellevue, in the county of Huron and State of Ohio, and WILLIAM P. JOHNSTON, residing at Monroe, in the parish of Ouachita and State of Louisiana, citizens of the United States, have invented a new and useful Fertilizer-Distributer, of which the following is a specification.

This invention relates to improvements in fertilizer-distributers; and the objects in view are to provide an attachment for corn and cotton cultivators, whereby they may be converted from such to a fertilizer-distributer adapted to form a furrow at each side of a row of young corn or cotton or any other plant, deposit a fertilizer in the bottom of the furrow, and cover the same to prevent evaporation, the whole being accomplished in a continuous operation.

By experience it has been found and it is the common practice followed that growing cotton or corn or any other plant is greatly invigorated and advanced by a distribution of fertilizing agents near the roots of the same. Heretofore this has been accomplished in diverse ways, one common way being to run a plow and form a furrow along the side of the row, subsequently deposit by hand or otherwise the fertilizing agent, and finally cover the land over the fertilizer. Such operation takes place at each side of a row and the labor and time expended will be readily appreciated. By our invention this labor and time are saved, and, as before stated, we accomplish the same through the medium of the ordinary corn-cultivator, to which our attachment is made, the operation being continuous or simultaneous and both sides of a row being treated.

Referring to the drawings, Figure 1 is a plan of a corn-cultivator provided with our attachments. Fig. 2 is a rear elevation thereof. Fig. 3 is a side elevation of the fertilizer-hopper and one of the fertilizer-tubes.

Like numerals and letters of reference indicate like parts in all the figures of the drawings.

1 designates the usual arched axle of an ordinary straddle-row corn-cultivator; 2, the ground-wheels; 3, the side bars surmounting the axle, and 4 the draft tongue or pole.

5 designates the opposite diverging beams, which are located at opposite sides and below the center of the axle, and each beam carries a series of three shovels, (designated in this instance as A, B, and C.)

Upon the side bars 3 we journal a transverse counter-shaft 6, providing the same near its center with a sprocket-wheel 7 and at one end with a sprocket-wheel 8. A sprocket-chain 9 passes over the sprocket-wheel 8 and also over a master sprocket-wheel 10, affixed to the hub of one of the ground-wheels and moving with said wheel. In this manner motion is imparted from the said ground-wheel to the aforesaid counter-shaft 6.

11 designates a hopper of ordinary construction, and the same is provided with a transverse agitator-shaft 12, and the shaft outside of the hopper carries a sprocket-wheel 13, which is operated by the sprocket 7 of the counter-shaft through the medium of the connecting sprocket-belt 14. From each side of the center of the bottom of the hopper 11 metal tubes depend, said tubes diverging toward their lower ends and connected by couplings 16 to the upper ends of flexible discharging-tubes 17, the lower ends of which occur directly in rear of the inner shovels A of the cultivator. To the standards of these shovels said tubes are loosely connected by bracket-rings 18, extending outwardly from the standards. The inner shovels A are outwardly turned, so as to throw the dirt away from the row during the formation of the furrow at each side of the row. The outer shovels B and C are turned inward, or so as to throw the dirt turned by the inner shovel from the furrow back into the same, which functions they perform immediately after the furrow is formed, inasmuch as they follow or are set one behind the other though out of alignment.

In operation the inner shovels A, as before stated, form the furrow simultaneously at each side of the growing plants and the fertilizer is distributed by the drill or discharge tubes into the bottom of the furrow as formed. By the time that the fertilizer has been distributed or deposited in the bottom of the furrow the second shovels B and immediately subsequent the third shovels C take up the loose dirt and return the same to the furrow, thus covering the fertilizer and preventing its evaporation by exposure. In this manner the plants get the full benefit and strength of the fertilizer, which is protected by the return of the soil to the furrow.

From the foregoing description, in connection with the accompanying drawings, it will be observed that by the simple additions to the ordinary straddle-row corn-cultivator of the elements described the same is converted into an efficient fertilizer-distributer, which effects a great saving of time and labor, and effectually distributes at each side of the row of corn, cotton, or any other plant the fertilizing agent and subsequently covers the same, all in one continuous and simultaneous operation.

We do not wish to be limited to the construction of the plows, the distributing-tubes, or any of the agencies employed in carrying out our invention, as it is apparent that such may be changed or modified at pleasure without departing from the spirit or sacrificing any of the advantages of our invention.

We claim to be the pioneers in this line and conceive that we are the first to originate a fertilizer-distributer which is adapted to form the furrows on each side of the growing plants, deposit the fertilizer in the furrow, and cover the furrow by one continuous operation.

Having described our invention, what we claim is—

1. A fertilizer-distributer constructed to form a furrow on each side of the growing plants, deposit fertilizer in the furrow, and cover the same by one continuous operation, consisting, essentially, of the framework carrying the furrow-openers, the fertilizer-discharge tubes terminating in the rear of the furrow-openers, and the covering-shovels, as set forth.

2. The fertilizer-distributer comprising the axle, the opposite ground-wheels, and the converging shovel-carrying beams adapted to straddle a row, the hopper located thereabove, and the diverging distributing tubes or drills leading from the hopper and terminating directly in the rear of the inner shovels by the beams, substantially as specified.

3. The fertilizer-distributer comprising the axle, the ground-wheels, the side bars, the opposite beams, and the series of shovel-carrying beams adapted to straddle a row, the superimposed centrally-located hopper, the agitating-shaft, means for communicating motion from the ground-wheels to the agitating-shaft, and the fertilizer-distributing tubes or drills depending from the hopper and terminating directly in rear of the inner shovels of the two series, substantially as specified.

4. The fertilizer-distributer comprising the axle, the ground-wheels, the side bars, the converging beams, and the series of shovels depending therefrom, the master-sprocket secured to the axle, the counter-shaft journaled in the side bars and carrying an inner and an outer sprocket, a chain connecting the latter with the sprocket of the ground-wheel, the hopper, the agitator-shaft therein, the sprocket-wheel on the outer end of the same, a chain connecting the inner sprocket of the shaft and the sprocket of the hopper, and the fertilizer tubes or drills depending from the hopper and terminating in rear of the inner shovels or series, substantially as specified.

5. The fertilizer-distributer consisting of the straddle-row cultivator, a superimposed hopper, and distributing drills or tubes depending from the hopper and terminating in rear of the shovels, substantially as specified.

6. The fertilizer-distributer consisting of the straddle-row cultivator having the opposite series of shovels and their converging supporting-beams, the inner shovels being outwardly disposed and the outer shovels inwardly disposed, the superimposed centrally-located hopper, and the distributing tubes or drills depending from the hopper and terminating in rear of the outwardly-disposed shovels and in advance of the inwardly-disposed shovels, substantially as specified.

In testimony that we claim the foregoing as our own we have hereto affixed our signatures in the presence of two witnesses.

HARLOW C. STAHL.
WM. P. JOHNSTON.

Witnesses to signature of H. C. Stahl:
  JESSE VICKERY,
  W. M. HALLIDAY.

Witnesses to signature of W. P. Johnston:
  ROBERT PROPHIT,
  J. M. WATSHALL.